United States Patent
Campbell, Jr. et al.

(10) Patent No.: US 6,191,245 B1
(45) Date of Patent: Feb. 20, 2001

(54) α-OLEFIN/VINYLIDENE AROMATIC MONOMER AND/OR HINDERED ALIPHATIC OR CYCLOALIPHATIC VINYLIDENE MONOMER INTERPOLYMERS

(75) Inventors: Richard E. Campbell, Jr.; Mark H. McAdon; Peter N. Nickias; Jasson T. Patton; Oscar D. Redwine; Francis J. Timmers, all of Midland, MI (US)

(73) Assignee: The Dow Chemical Company, Midland, MI (US)

( * ) Notice: Under 35 U.S.C. 154(b), the term of this patent shall be extended for 0 days.

(21) Appl. No.: 09/254,251

(22) PCT Filed: Sep. 4, 1997

(86) PCT No.: PCT/US97/15559

§ 371 Date: Mar. 2, 1999

§ 102(e) Date: Mar. 2, 1999

(87) PCT Pub. No.: WO98/09999

PCT Pub. Date: Mar. 12, 1998

(51) Int. Cl.⁷ .............................. C08F 212/08; C08F 4/44
(52) U.S. Cl. ...................... 526/347; 526/348.2; 526/308; 526/160; 526/161; 526/943; 502/152
(58) Field of Search .................................. 526/160, 161, 526/172, 347, 348.2, 339, 340, 308, 282

(56) References Cited

U.S. PATENT DOCUMENTS

| | | | |
|---|---|---|---|
| 4,076,698 | 2/1978 | Anderson et al. | 526/348.6 |
| 5,362,824 | 11/1994 | Furtek et al. | 526/114 |
| 5,362,825 | 11/1994 | Hawley et al. | 526/125 |
| 5,703,187 | 12/1997 | Timmers | 526/282 |

FOREIGN PATENT DOCUMENTS

| | | | |
|---|---|---|---|
| 0 416 815 A2 | 3/1991 | (EP) | C08F/10/00 |
| 0 572 990 A2 | 12/1993 | (EP) | C08F/210/02 |
| 0 638 593 A1 | 2/1995 | (EP) | C08F/4/60 |
| 7/278230 | 10/1995 | (JP) | C08F/210/02 |
| 95/32095 | 11/1995 | (WO) | B32B/27/32 |
| WO 96/07681 * | 3/1996 | (WO) . | |

OTHER PUBLICATIONS

Gerald Lancaster et al., "Applications of Insite * Technology in the Rubber/Elastomer Market", Proceedings of Fifth International Business Forum on Specialty Polyolefins SPO '95 Sep. 20–22, 1995, pp. 109–123.

Derwent Abstract 95–309200/40 (JP 07/207036) Dec. 1, 1993.

Derwent Abstract 95–281168/37 (JP 07/179847) Dec. 22, 1993.

(List continued on next page.)

Primary Examiner—David W. Wu
Assistant Examiner—R. Harlan

(57) ABSTRACT

The present invention relates to α-olefin/vinyl aromatic monomer interpolymers with characteristic signals in their carbon 13 NMR spectra. In particular, ethylene/styrene copolymers of the present invention have peaks in the carbon 13 NMR spectra which appear in the chemical shift range 43.70–44.25 ppm, preferably from 43.75–44.25 ppm and 38.0–38.5 ppm, said peaks being at least three times the peak to peak noise. The interpolymers are prepared by polymerizing the appropriate mixture of monomers in the presence of a catalyst such as racemic-(dimethylsilanediyl (2-methyl-4-phenylindenyl)) zirconium dichloride. The polymers of the present invention posses increased modulus as determined from both tensile stress/strain and dynamic mechanical data at comparable vinyl aromatic monomer levels.

9 Claims, 4 Drawing Sheets

OTHER PUBLICATIONS

Derwent Abstract 95–401001/51 (JP 07278230) Oct. 24, 1995.

Patent Application Entitled "Constrained Geometry Addition Polymerization Catalysts, Processes for Their Preparation, Precursors Therefor, Methods of Use, and Novel Polymers Formed Therewith" filed in the United States of America on Jul. 3, 1990; Application No. 545,403; Aplicant: J.C. Stevens, G.F. Schmidt, F.J. Timmers D.R. Wilson, P.N. Nickias, S. Lai, G.W. Knight, R.K. Rosen, C–38099–A (Pending).

"Compatibilization of Polyethyleen–Polystyrene Blends with Ethylene–Styrene Random Copolymers", Chung P. Park et al., *Soc. Plast. Engrs. Antec'96*, pp. 1887–1891, May 5–10, 1996 discloses ethylene–styrene copolymers as a compatabilizer for blends of polyethylene and polysyrene.

"Structure, Thermal Transitions and Mechanical Properties of Ethylene/Styrene Copolymers", Y. Wilson Cheung et al., *Soc. Plast. Engrs. Antec'96*, pp. 1634–1637, May 5–10, 1996 discloses various properties of ethylene.styrene copolymers.

"Material Properties and Applications of Ethylene–Styrene Interpolymer sfrom Metallocene Catalyst", Steve Hoenig et al., *Proceedings of Sixth International Business Forum on Speciaty Polyolefins SPO'96*, pp. 261–268, Spet. 25–27, 1996 discloses various properties for ethylene–styrene interpolymers.

Guangxue Xu and Shangan Lin, *American Chemical Society*, vol. 35, No. 1, "Polymer Preprints: Copolymerization of Styrene and Propene with Supported Ti Catalyst Comprising Nd Compound", pp. 686–687, (1994).

* cited by examiner

α-OLEFIN/VINYLIDENE AROMATIC MONOMER AND/OR HINDERED ALIPHATIC OR CYCLOALIPHATIC VINYLIDENE MONOMER INTERPOLYMERS

The present invention concerns α-olefin/vinyl aromatic monomer and/or hindered aliphatic or cycloaliphatic vinyl or vinylidene monomer interpolymers and a process for their preparation.

α-Olefin/vinyl aromatic monomer interpolymers have been prepared as disclosed by James C. Stevens et al., in EP 0 416 815 A2 published Mar. 13, 1991. In addition, M. Takeuchi et al., in EP 0 707 014 A1 published Apr. 17, 1996, disclose a process for producing an aromatic vinyl compound copolymer having a high degree of syndiotactic configuration in its aromatic vinyl chain. Also D. D. Devore et al., in WO 95/00526 published on Jan. 5, 1995, disclose titanium or zirconium complexes containing one and only one cyclic delocalized anionic π-bonded group wherein the titanium or zirconium is in the +2 formal oxidation state. F. J. Timmers et al., in WO 96/04290 published on Feb. 15, 1996 describes biscyclopentadienyl diene complexes of Group 4 transition metals. Finally K. W. McKay et al., in WO 96/07681, published on Mar. 14, 1996, describes a thermoset elastomer comprising a crosslinked pseudorandom or substantially random interpolymer of at least one α-olefin, at least one vinyl aromatic compound, and at least one diene. The subject invention also provides a thermoplastic vulcanizate comprising the thermoset elastomer as provided in a themoplastic polyolefin matrix.

While these interpolymers have good properties, it is always desirable to have available polymers having an improvement in one or more properties.

The present invention relates to α-olefin/vinyl aromatic monomer and/or hindered aliphatic or cycloaliphatic vinyl or vinylidene monomer interpolymers with characteristic signals in their carbon 13 NMR spectra. In particular, ethylene/styrene copolymers of the present invention have peaks detectable in the carbon 13 NMR spectra which appear in the chemical shift range of 43.70–44.25, generally from 43.75–44.25 ppm and 38.0–38.5 ppm said peaks being at least three times the peak to peak noise.

Another aspect of the present invention pertains to α-olefin/vinyl aromatic monomer and/or hindered aliphatic or cycloaliphatic vinyl or vinylidene monomer interpolymers containing one or more tetrad sequences consisting of α-olefin/vinyl aromatic monomer or hindered aliphatic or cycloaliphatic vinyl or vinylidene monomer/vinyl aromatic monomer or hindered aliphatic or cycloaliphatic vinyl or vinylidene monomer/α-olefin detectable by carbon 13 NMR spectroscopy wherein the monomer insertions of said tetrads occur exclusively in a 1,2 (head to tail) manner.

The present invention also pertains to a process for preparing α-olefin /vinyl aromatic monomer and/or hindered aliphatic or cycloaliphatic vinyl or vinylidene monomer interpolymers, said process comprising subjecting to polymerizing conditions a combination of (1) α-olefin, (2) one or more vinyl aromatic monomers, and (3) optionally, one or more polymerizable ethylenically unsaturated monomers other than (1) or (2) such as an α-olefin or diene; in the presence of a catalyst represented by the general formula:

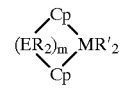

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl; each R' is independently, each occurrence, H, halo, hydrocarbyl, hydrocarbyloxy, silahydrocarbyl, hydrocarbylsilyl, or two R' groups together can be a hydrocarbyl substituted 1,3-butadiene; m is 1 or 2; and optionally, but preferably, in the presence of an activating cocatalyst.

The polymers of the present invention possess increased modulus, as determined from both tensile stress/strain and dynamic mechanical data, at comparable vinyl aromatic monomer levels.

The present invention can comprise, consist of, or consist essentially of, all or only a portion of the aforementioned components, compounds, substituent groups or reaction steps. Components, compounds, substituent groups or reaction steps can be eliminated singly or in multiples of any two or more.

Figure 1:
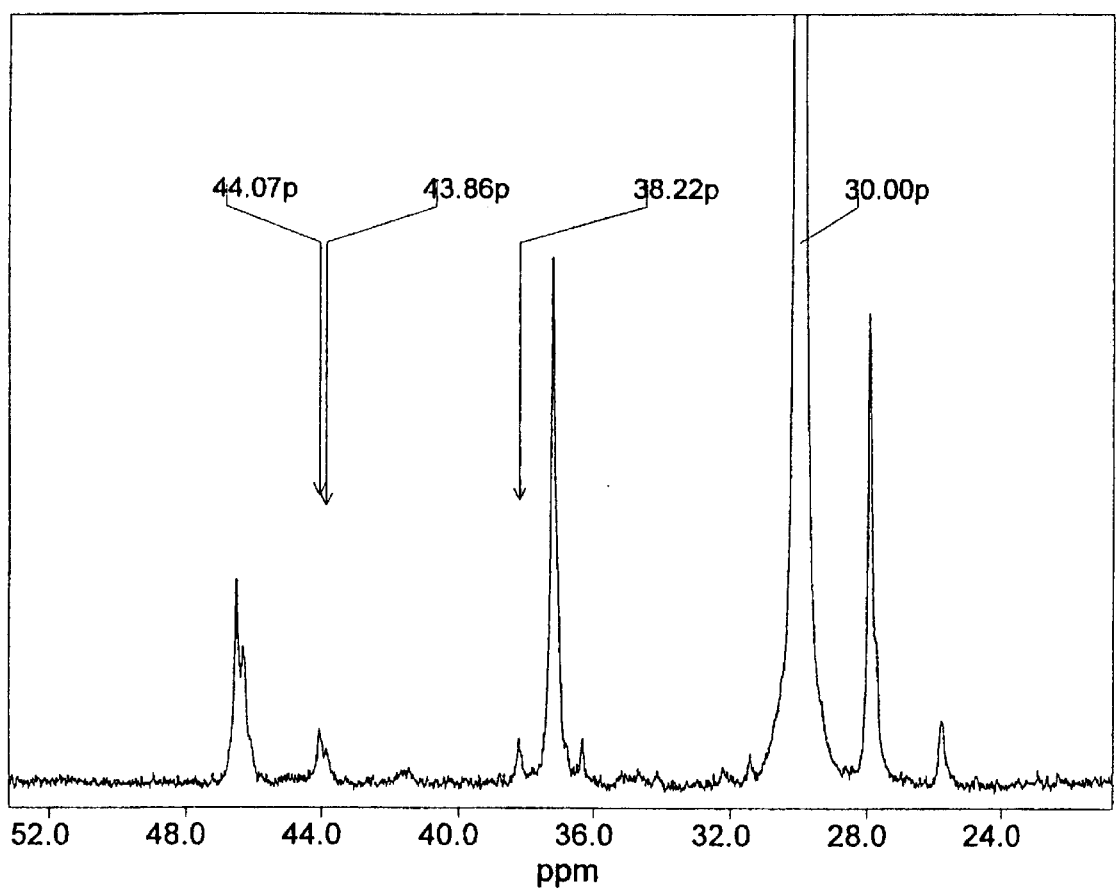
FIG. 1 is a proton decoupled carbon 13 NMR spectrum (150 MHz) of example 1 of the present invention, an ethylene/styrene copolymer containing ESSE tetrad(s).

The α-olefin/vinyl aromatic monomer interpolymers of the present invention are characterized using carbon 13 NMR spectroscopy. The carbon 13 NMR spectra of ethylene/styrene interpolymers display signals in the chemical shift region 20 to 50 ppm as previously observed for pseudo random ethylene/styrene interpolymers such as those described in copending application Ser. No. 08/481,791 filed Jun. 7, 1995 (equivalent to WO 96/04290 published Feb. 15, 1996). These signals previously observed for the pseudo random interpolymers appear in the regions 25–26 ppm, 27–28 ppm, 29–31 ppm, 34–35 ppm, 36.5–37.5 ppm, and 45–47 ppm. In addition, peaks between 40–47 ppm are sometimes observed. These other peaks between 40 and 47 ppm are believed to be due to the ubiquitous polystyrene (aPS) which results from thermal polymerization of styrene monomer to give an amorphous material which is present as a blend with the ethylene/styrene copolymer. If aPS is present, its most prominent signal is near 41 ppm.

The ethylene/styrene interpolymers contain additional signals with intensities greater than three times the peak to peak noise. These signals appear in the chemical shift range 43.70–44.25 ppm, generally from 43.75–44.25 ppm and 38.0–38.5 ppm. Specifically, major peaks are observed at 44.1, 43.9 and 38.2 ppm. An Attached Proton Test (APT) NMR experiment indicates that the signals in the chemical shift region 43.70–44.25 ppm are methine carbons and the signals in the region 38.0–38.5 ppm are methylene carbons.

In order to determine the carbon 13 NMR chemical shifts of the interpolymers of the present invention, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris (acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

While not wishing to be bound by any particular theory it is believed that these new signals are due to sequences involving two head-to-tail vinyl aromatic monomer insertions preceded and followed by at least one ethylene insertion, for example, an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene, and an α-olefin other than ethylene, that the ethylene/vinyl aromatic monomer/vinyl aromatic monomer/ethylene tetrad will give rise to similar carbon 13 NMR peaks but with slightly different chemical shifts.

The term "hydrocarbyl" means any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "interpolymer" is used to indicate a polymer wherein at least two different monomers are polymerized to make the interpolymer. This includes copolymers, and terpolymers.

The term "substantially random" in the substantially random interpolymer comprising an a-olefin and a vinyl aromatic monomer as used herein means that the distribution of the monomers of said interpolymer can be described by the Bernoulli statistical model or by a first or second order Markovian statistical model, as described by J. C. Randall in *POLYMER SEQUENCE DETERMINATION, Carbon 13 NMR Method,* Academic Press New York, 1977, pp. 71–78. Preferably, the substantially random interpolymer comprising an α-olefin and a vinyl aromatic monomer does not contain more than 15 percent of the total amount of vinyl aromatic monomer in blocks of vinyl aromatic monomer of more than 3 units. More preferably, the interpolymer was not characterized by a high degree of either isotacticity or syndiotacticity. This means that in the 13C-NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Suitable catalysts which can be employed in the process of the present invention include those represented by the general formula:

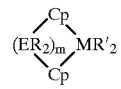

wherein: each Cp is independently, each occurrence, a substituted cyclopentadienyl group n-bound to M; E is C or Si; M is a group IV metal, preferably Zr or Hf, more preferably Zr; each R is independently, each occurrence, hydrogen, hydrocarbyl, silahydrocarbyl, or hydrocarbylsilyl, containing up to 30 preferably from 1 to 20 more preferably from 1 to 10 carbon or silicon atoms; each R' is independently, each occurrence, hydrogen, halo, hydrocarbyl, hyrocarbyloxy, silahydrocarbyl, hydrocarbylsilyl containing up to 30 preferably from 1 to 20 more preferably from 1 to 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

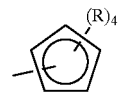

wherein each R is independently, each occurrence, hydrogen, hydrocarbyl, silahydrocarbyl, or hydrocarbylsilyl, containing up to 30 preferably from 1 to 20 more preferably from 1 to 10 carbon or silicon atoms or two adjacent R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, octahydrofluorenyl, or R susbstituted derivatives thereof.

Particularly preferred catalysts include, for example, racemic-(dimethylsilanediyl)-bis-(2-methyl-4-phenylindenyl))zirconium dichloride, racemic-(dimethylsilanediyl)-bis-(2-methyl-4-phenylindenyl)) zirconium 1,4-diphenyl-1,3-butadiene, racemic-(dimethylsilanediyl)-bis-(2-methyl-4-phenylindenyl)) zirconium di-$C_{1-4}$ alkyl, racemic-(dimethylsilanediyl)-bis-(2-methyl-4-phenylindenyl))zirconium di-$C_{1-4}$ alkoxide, or any combination thereof.

Also included as catalysts useful for the preparation of the copolymers of the present invention are [N-(1,1-dimethylethyl)-1,1-dimethyl-1-[(1,2,3,4, 5-η)-1,5,6,7-tetrahydro-s-indacen-1-yl]silanaminato(2-)-N]titanium dimethyl, (1-indenyl) (tert-butyl amido)dimethylsilane titanium dimethyl, ((3-tert-butyl) (1,2,3,4,5-η)-1-indenyl) (tert-butyl amido)dimethylsilane titanium dimethyl, and ((3-iso-propyl)(1,2,3,4,5-η)-1-indenyl) (tert-butyl amido) dimethylsilane titanium dimethyl.

The term "activating cocatalyst" as used herein refers to a secondary component of the catalyst able to cause the metal-containing complex to become effective as an addition polymerization catalyst or alternatively to balance the ionic charge of a catalytically activated species. Examples of suitable activating cocatalysts for use herein include, for example, aluminum compounds containing an Al—O bond such as the alkylalumoxanes, especially methylalumoxane; aluminum alkyls; aluminum halides; aluminum alkyl halides; strong Lewis acids such as, for example, tris (pentafluorophenyl)borane; the following salts which contain a compatible noninterfering counterion such as tetrakis (pentafluorophenyl) borate, hydro(trihydrocarbyl) ammonium salts and oxidizing agents, such as silver salts or ferrocenium salts; and mixtures of the foregoing.

Suitable α-olefins include, for example, α-olefins containing from 2 to 20, preferably from 2 to 12, more preferably from 2 to 8 carbon atoms. Particularly suitable are ethylene, propylene, butene-1, 4-methyl-1-pentene, hexene-1 and octene-1. Also suitable as are dienes such as, for example, ethylidene norbornene, 1,4-hexadiene, and piperylene; with ethylidene norbornene being preferred. The dienes are usually employed in amounts of from 1 to 5 mole percent of the polymer.

Suitable vinyl aromatic monomers include, for example, those represented by the formula Ar—CH=CH$_2$ wherein Ar is a phenyl group or a phenyl group substituted with from 1 to 5 substituents selected from the group consisting of halo, $C_{1-4}$-alkyl, and $C_{1-4}$-haloalkyl. Exemplary monovinyl aromatic monomers include styrene, vinyl toluene, t-butyl styrene, including all isomers of these compounds. Particularly suitable such monomers include styrene and lower alkyl- or halogen-substituted derivatives thereof. Preferred monomers include styrene, the lower alkyl- or phenyl-ring substituted derivatives of styrene, such as ortho-, meta-, and para-methylstyrene, the ring halogenated styrenes, para-vinyl toluene or mixtures thereof. A more preferred monovinyl aromatic monomer is styrene.

Suitable hindered aliphatic or cycloaliphatic vinyl or vinylidene monomers which can be employed herein include, for example, the addition polymerizable vinyl or vinylidene monomers corresponding to the formula:

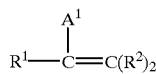

wherein $A^1$ is a sterically bulky, aliphatic or cycloaliphatic substituent of up to 20 carbons, $R^1$ is selected from the group of radicals consisting of hydrocarbyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with α-olefin polymerizations. Preferred hindered aliphatic or cycloaliphatic vinyl or vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl. Most preferred hindered aliphatic or cycloaliphatic vinyl or vinylidene monomers are vinyl cyclohexane, the various isomeric vinyl- ring substituted derivatives of cyclohexene and substituted cyclohexenes, and 5-ethylidene-2-norbornene. Especially suitable are 1-, 3-, and 4-vinylcyclohexene.

The polymerization is conducted according to known techniques for Ziegler-Natta or Kaminsky-Sinn type polymerizations. That is, the monomers and catalyst are contacted at a temperature from –30° C. to 250° C., at elevated or atmospheric pressures. The polymerization is conducted under an inert atmosphere which may be a blanketing gas such as nitrogen or argon. Hydrogen may additionally be utilized in the control of molecular weight through chain termination as is previously known in the art. The catalyst may be used as is or supported on a suitable support such as alumina, MgCl$_2$ or silica to provide a heterogeneous supported catalyst. A solvent may be employed if desired. Suitable solvents include toluene, ethylbenzene, and excess vinyl aromatic or olefin monomer. The reaction may also be conducted under solution or slurry conditions, in a suspension utilizing a perfluorinated hydrocarbon or similar liquid, in the gas phase, ie. utilizing a fluidized bed reactor, optionally under condensing mode, or in a solid phase powder polymerization. A catalytically effective amount of the present catalyst and cocatalyst are any amounts that successfully result in formation of polymer. Such amounts may be readily determined by the routine experimentation by the skilled artisan. Preferred amounts of catalyst and cocatalyst are sufficient to provide an equivalent ratio of addition polymerizable monomer:catalyst of from $1\times10^{10}$:1 to 100:1, preferably from $1\times10^8$:1 to 500:1, most preferably $1\times10^6$:1 to 1,000:1. The cocatalyst is generally utilized in an amount to provide an equivalent ratio of cocatalyst:catalyst from 10,000:1 to 0.1:1, preferably from 1,000:1 to 1:1.

It is to be understood that the metal complex may undergo various transformations or form intermediate species prior to and during the course of a polymerization. Thus other precursors could possibly be conceived to achieve the same catalytic species.

The resulting polymeric product is recovered by filtering or other suitable technique. Additives and adjuvants may be incorporated in the polymers of the present invention in order to provide desirable characteristics. Suitable additives include pigments, UV stabilizers, antioxidants, blowing agents, lubricants, plasticizers, photosensitizers, and mixtures thereof.

On a limited basis, the vinyl aromatic monomer may insert into the polymer chain in reverse order, ie. so as to result in two methylene groups between the substituted polymer backbone moiety.

The interpolymers of one or more α-olefins and one or more monovinyl aromatic monomers employed in the present invention are substantially random polymers. These interpolymers usually contain from 1 to 65, preferably from 5 to 60, more preferably from 10 to 55 mole percent of at least one vinyl aromatic monomer and from 35 to 99, preferably from 40 to 95, more preferably from 45 to 90 mole percent of at least one aliphatic α-olefin having from 2 to 20 carbon atoms The number average molecular weight (Mn) of the polymers and interpolymers is usually greater than 1,000, preferably from 5,000 to 1,000,000, more preferably from 10,000 to 500,000.

While preparing the substantially random interpolymer, an amount of atactic vinyl aromatic homopolymer may be formed due to homopolymerization of the vinyl aromatic monomer at elevated temperatures. In general, the higher the polymerization temperature, the higher the amount of homopolymer that is formed. The presence of vinyl aromatic homopolymer is in general not detrimental for the purposes of the present invention and may be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 20 weight percent, preferably less than 15 weight percent based on the total weight of the interpolymers of vinyl aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

Additives such as antioxidants (for example, hindered phenols such as, for example, Irganox® 1010 a registered trademark of CIBA-GEIGY), phosphites (for example, Irgafos® 168, a registered trademark of CIBA-GEIGY), u. v. stabilizers, cling additives (for example, PIB), antiblock additives, slip agents, colorants, pigments, fillers can also be included in the interpolymers employed in the blends of and/or employed in the present invention, to the extent that they do not interfere with the enhanced properties discovered by Applicants.

The additives are employed in functionally equivalent amounts known to those skilled in the art. For example, the amount of antioxidant employed is that amount which prevents the polymer from undergoing oxidation at the temperatures and environment employed during storage and ultimate use of the polymers. Such amounts of antioxidants is usually in the range of from 0.01 to 10, preferably from 0.05 to 5, more preferably from 0.1 to 2 percent by weight based upon the weight of the polymer.

Similarly, the amounts of any of the other enumerated additives are the functionally equivalent amounts such as the amount to render the polymer antiblocking, to produce the desired amount of filler loading to produce the desired result, to provide the desired color from the colorant or pigment. Such additives can suitably be employed in the range of from 0.05 to 50, preferably from 0.1 to 35 more preferably from 0.2 to 20 percent by weight based upon the weight of the polymer. However, in the instance of fillers, they could be employed in amounts up to 90 percent by weight based on the weight of the polymer.

The polymers of the present invention are useful as asphalt additives, films, adhesives, injection molded articles. The polymers of the present invention find particular utility in applications where a stiffer material response is desired, such as, for example, in some adhesive formulations, and the manufacture of tougher single and multilayer films and certain molded articles.

The following examples are exemplary of the invention.

EXAMPLE 1
A. Polymer Preparation

A two liter stirred reactor was charged with 357 g (500 mL) of mixed alkane solvent (Isopar™-E a registered trademark of and available from Exxon Chemicals Inc.) and 461 g of styrene comonomer (500 mL). Hydrogen was added to the reactor by differential pressure expansion from a 75 mL addition tank, 51 delta psi (35 kPa). The reactor was heated to the run temperature, 70° C., and the reactor was saturated with ethylene at the desired pressure, 200 psig (1380 kPa). Catalyst and cocatalyst were mixed in a dry box by mixing the catalyst, racemic-(dimethylsilanediyl(2-methyl-4-phenylindenyl))zirconium dichloride, and cocatalyst, methylalumoxane (MAO), in toluene in an inert atmosphere glove box. The resulting solution was transferred to a catalyst addition tank and injected into the reactor. The polymerization was allowed to proceed with ethylene on demand. Additional charges of catalyst and cocatalyst, if used, were prepared in the same manner and were added to the reactor periodically. A total of 8.5 mmol of the catalyst with 8.5 mmol of MAO was added. After the run time, 30 min, the polymer solution was removed from the reactor. Volatiles were removed from the polymer in a reduced pressure vacuum oven at 135° C. for 20 hrs. 26.1 g of polymer was isolated with a melt index ($I_2$) of 0.33. Proton NMR analysis indicates that the material was 11.1 mol % (31.7 wt %) styrene.

FIG. 1 was a proton decoupled carbon 13 NMR spectrum (150 MHz) of the above prepared ethylene/styrene copolymer. This ethylene/styrene copolymer contains ESSE tetrads as indicated by the peaks at 44.066, 43.860 and 38.215.

Comparative Experiment A

Preparation of Copolymer

Polymer was prepared in a 400 gallon (1.512 m$^3$) agitated semi-continuous batch reactor. The reaction mixture consisted of approximately 250 gallons (0.95 m$^3$) of solvent comprising a mixture of cyclohexane (85 wt percent) and isopentane (15 wt percent), and styrene. Prior to addition, solvent, styrene and ethylene were purified to remove water and oxygen. The inhibitor in the styrene was also removed. Inerts were removed by purging the vessel with ethylene. The vessel was then pressure controlled to a set point with ethylene. Hydrogen was added to control molecular weight. Temperature in the vessel was controlled to set-point by varying the jacket water temperature on the vessel. Prior to polymerization, the vessel was heated to the run temperature and the catalyst components titanium (N-1,1-dimethylethyl) di-methyl(1-(1,2,3,4,5-1)-2,3,4,5-tetramethyl-2,4-cyclopentadien-1-yl)silan-aminato))(2-)N)-dimethyl, CAS# 135072-62-7, Tris(pentafluorophenyl)boron, CAS# 001109-15-5, modified methylalumoxane Type 3A, CAS# 146905-79-5, were flow controlled, on a mole ratio basis of 1/3/5 respectivily, combined and added to the vessel. After starting, the polymerization was allowed to proceed with ethylene supplied to the reactor as required to maintain vessel pressure, with hydrogen addition to the headspace of the reactor to maintain a mole ratio with respect to the ethylene concentration. At the end of the run, the catalyst flow was stopped, ethylene was removed from the reactor, 1000 ppm of Irganox* 1010 anti-oxidant was then added to the solution and the polymer was isolated from the solution. The resulting polymer was isolated from solution by use of a devolatilizing extruder. In the case of the steam stripped material, additional processing was required in extruder like equipment to reduce residual moisture and any unreacted styrene.

| Sample Number | Solvent loaded lbs | Solvent loaded kg | Styrene loaded lbs | Styrene loaded kg | Pressure Psig | Pressure kPa | Temp. °C. | Total H$_2$ Added Grams | Run Time Hours | Polymer in Solution Wt. % | Melt Index | Total Wt % Styrene in Polymer |
|---|---|---|---|---|---|---|---|---|---|---|---|---|
| C.E. A* | 1196 | 542 | 225 | 102 | 70 | 483 | 60 | 7.5 | 6.1 | 7.2 | 0.03 | 29.8 |

Polymer Testing

Test parts and characterization data for the polymers of Example 1 and Comparative Experiment A were generated according to the following procedures:

Compression Molding

Samples were melted at 190° C. for 3 minutes and compression molded at 190° C. under 20,000 lb (9,072 kg) of pressure for another 2 minutes. Subsequently, the molten materials were quenched in a press equilibrated at room temperature.

Differential Scanning Calorimetry (DSC)

A Dupont DSC-2920 was used to measure the thermal transition temperatures and heat of transition for the interpolymers. In order to eliminate previous thermal history, samples were first heated to 200° C. Heating and cooling curves were recorded at 10° C./min. Melting (from second heat) and crystallization temperatures were recorded from the peak temperatures of the endotherm and exotherm, respectively. The percent crystallinity was estimated from the area under the second heating endotherm, using a value of 292 J/g for fully crystalline polyethylene.

Mechanical Testing

Tensile properties of the compression molded samples were measured using an Instron 1145 tensile machine equipped with an extensiometer. ASTM-D638 micro-tensile samples were tested at a strain rate of 5 min$^{-1}$. The average of four tensile measurements was given. The yield stress and yield strain were recorded at the inflection point in the stress/strain curve. The Energy at break was the total area under the stress/strain curve.

Dynamic Mechanical Testing(DMS)

Data were generated on compression molded samples using a Rheometrics 800E mechanical analyzer. Samples were run in torsion rectangular geometry and purged under nitrogen. Data were collected using a forced fixed frequency of 10 rad/sec, a torsional strain of 0.05% with data collected isothermally at 4° C. intervals.

|  | Comparative Experiment (A)* | Example 1 |
|---|---|---|
| Total wt % S | 29.8 | 31.7 |
| wt % PS** | 1 | 1 |
| wgt % S in ES | 29.3 | 31 |
| mole % S in ES | 10.05 | 10.8 |
| MFR, I$_2$ | 0.03 | 0.33 |
| Mw x 10$^{-3}$ | 240.9 | 308.6 |
| Mw/Mn | 2.04 | 4.48 |
| DSC |  |  |
| Tm, °C. | 70 | 124.2/101.3/67.2 |
| % Crystallinity | 21.7 | 31.3 |
| Tc, °C. | 58.2 | 97.5/51.1 |
| Tg | −17.2 | — |
| Stress/strain |  |  |
| Tensile Modulus, MPa | 20.0 | 60 |
| Yield % Strain | 19.2 | 14.2 |
| Yield Stress, MPa | 2.7 | 4.2 |
| % Strain at Break | 397.4 | 481.2 |
| Stress at Break, MPa | 18.5 | 25.2 |
| Energy at Break, MPa | 89.6 | 123.9 |
| DMS |  |  |
| G'(−40° C.) x 10$^{-7}$ dyne/cm$^2$ (Pa) | 560 (56) | 780 (78) |
| G'(0° C.) x 10$^{-7}$ dyne/cm$^2$ (Pa) | 29 (2.9) | 76 (7.6) |
| G'(40° C.) x 10$^{-7}$ dyne/cm$^2$ (Pa) | 6.8 (0.68) | 17 (1.7) |
| Tg(G"max) °C. | −8 | −7.9 |
| G"max at Tg x 10$^{-8}$ dyne/cm$^2$(Pa) | 7.9 (0.79) | 6.0 (0.60) |
| Tg(tan δ max) °C. | −7.9 | −7.9 |

*Not an example of the present invention
**Determined by proton NMR techniques

The copolymer of example 1 also contains 1.2% high density PE fraction, as measured by ATREF techniques.

The copolymer of example 1 was compared with an ethylene/styrene copolymer (comparative experiment A) having a pseudorandom structure having similar styrene comonomer content, and prepared using one of the catalyst types disclosed in EP 0 416 815 A2.

In addition to the N.M.R. characterization, which show the unique styrene sequencing, there were identified performance characteristics which were significantly different for these materials.

The polymer structures were more heterogeneous, as evidenced by the more diffused, multiple melt transitions of the DSC data.

From dynamic mechanical data, although the polymers of the present invention have the same glass transition temperature, and a similar width of the loss peak, the structure shows a significantly reduced peak amplitude in the dynamic mechanical loss spectra.

The microstructural difference of the polymers of the present invention translates into desirable mechanical property modifications, for example the increased modulus from both tensile stress/strain and dynamic mechanical data as compared to known ethylene/styrene interpolymers.

The polymers of the present invention could be preferred over the "pseudo-random" copolymers in applications where a stiffer, more elastic material response was desirable, for example in some adhesive formulations, and for the manufacture of tougher single and multilayer films.

Comparative Experiment B

The polymer sample was prepared in a continuous loop reactor which behaves as an isothermal CSTR. The reactor loop was composed of two ½ Koch SMX static mixers, a custom, 1200 mL/min, magnetically coupled, Micropump® gear pump (available from and a registered trademark of the Idex Corporation) and assorted ½ Swagelok® tube fittings (available from and a registered trademark of the Swagelok Corporation). The loop was equipped with two inlets, one for metered flows of purified ethylene, hydrogen, toluene and mixtures of styrene and toluene, the other for the active catalyst system. A pressure transducer on the feed inlet and a duel thermocouple in the loop provided inputs for PID control of reactor pressure and temperature via heating tapes on the static mixers and a Research Control valve on the reactor outlet. An in-line viscometer from Cambridge Applied Scientifics monitors the outlet flow, which was subsequently blended with a catalyst kill and cooled to ambient temperature.

Solvents and gases were purified by passage through activated A-2 alumina (liquids), activated A-204 alumina (gases) and activated Q-5 reactant. The samples was prepared in a solvent that consists of 50 percent by weight styrene monomer in toluene. The mixture was sparged with helium for two hours and allowed to stand under a 20 psig (138 kPa) helium pad overnight.

Solvent/styrene mixture flow was 12.05 mL/min. The reactor was heated to the desired run temperature (90° C.) and catalyst flow begun. After the temperature stabilizes, ethylene flow was started (1.475 g/min) and catalyst and cocatalyst flows adjusted to achieve a steady reaction (0.225 mL/min). The hydrogen flow rate was 0.4 mg/min. The reactor was then allowed to line out until viscosity was stable (usually an hour) and collection of product begun.

The catalyst, [($\eta^5$-$C_5Me_4$)$Me_2SiN^tBu$]$TiMe_2$, and cocatalyst, $B(C_6F_5)_3$ used were as previously described in Comparative Experiment A. The catalyst and cocatalyst solutions were prepared in an inert atmosphere glove box as 0.00100 M in toluene. These solutions were pumped to the reactor.

The polymer solution was quenched upon exiting the reactor with a toluene solution consisting of a catalyst kill, isopropyl alcohol (15 mL/L), and an antioxidant, Irganox 1010 (0.02 g/mL). The polymer solution was collected for 90 min. The cooled polymer solution was placed in a vacuum oven in which the temperature was slowly ramped from 40° C. to 130° overnight. The polymer was cooled to below 50° C. before removing it from the vacuum oven the next day. 126.9 g of polymer was isolated. It had a melt index (I2) of 2.8 and was found by NMR spectroscopy to be 11 mole percent styrene.

Figure 2:
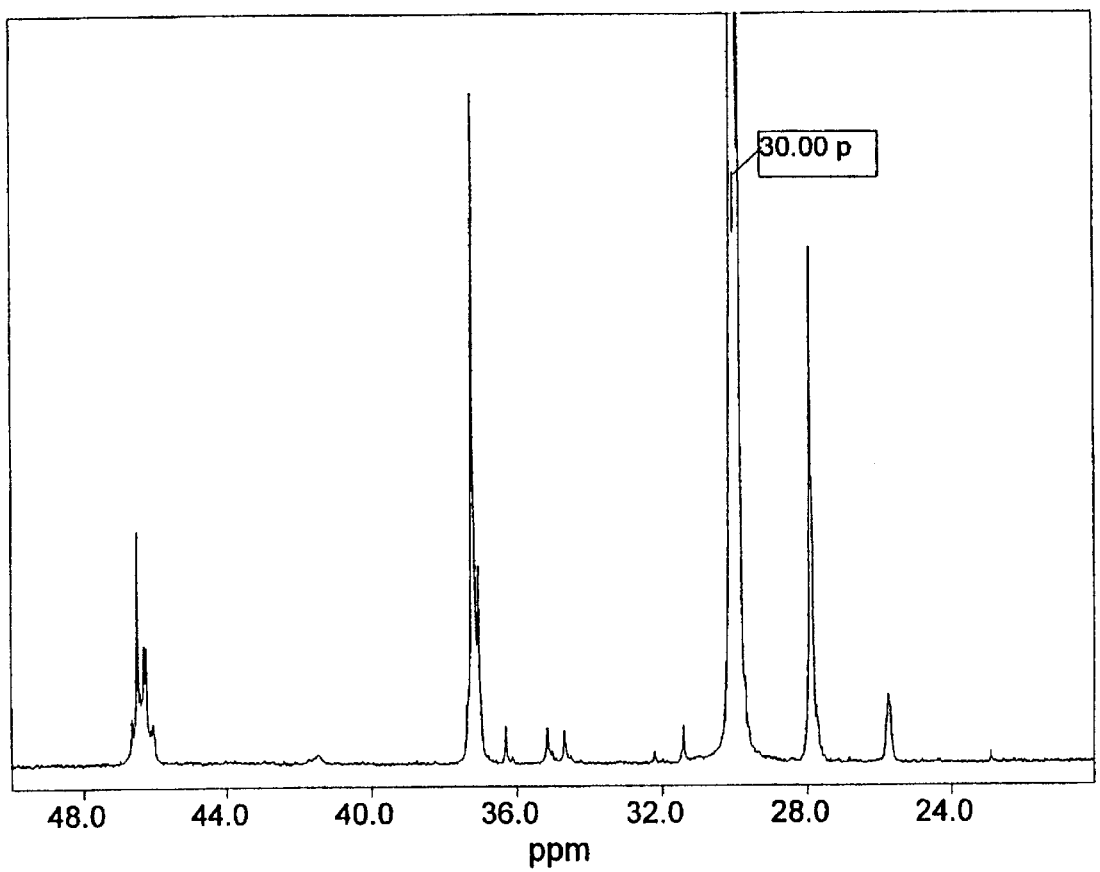
FIG. 2 is a proton decoupled carbon 13 NMR spectrum (150 MHz) of comparative experiment B an example of a "pseudorandom" ethylene/styrene copolymer of the prior art.

FIG. 2 was a proton decoupled carbon 13 NMR spectrum (150 MHz) of the above prepared "pseudo-random" ethylene/styrene copolymer. This ethylene/styrene copolymer does not contain any ESSE tetrads as indicated by the absence of peaks at 44.066, 43.860 and 38.215.

EXAMPLE 2

Synthesis of Catalyst A, (1-indenyl)(tert-butyl amido) dimethylsilane titanium dimethyl:
Preparation of Lithium indenide.
Indene (10.0 g, 0.0861 moles) was stirred in hexane (150 mL) as n-BuLi (0.8783 moles, 54.8 mL of 1.6 M solution in hexane) was added drop wise. The mixture was allowed to stir overnight at room temperature during which time a solid precipitated. After the reaction period the solid was collected via suction filtration, washed with hexane, dried under vacuum, and was used without further purification or analysis (9.35 g, 89.1% yield).

Preparation of Dimethylsilyl(indenyl)(t-butylamine).
Lithium indenide (1.73 g, 0.014 moles) in THF (50 mL) was added drop wise to a solution of dimethylsilyl(t-butylamino) chloride (3.53 g, 0.021 moles) in THF (75 mL). This mixture was allowed to stir for 6.5 hrs. And the volatile materials were removed. The residue was extracted and filtered using hexane. Removal of the hexane resulted in the isolation of the desired product as an oil (2.53 g, 74.3% yield).

$^1$H NMR (CHCl$_3$): d-0.037 (s, 3H), 0.012 (s, 3H), 1.268 (s, 9H), 3.669 (s, 1H), 6.740 (d, 1H), 6.959 (d, 1H), 7.190–7.310 (m, 2H), 7.500 (d, 1H), 7.595 (d, 1H).

Preparation of Dimethylsilyl(indenyl)(t-butylamido)Li$_2$.
Dimethylsilyl(indenyl)(t-butylamino) (2.41 g, 0.0098 moles) was stirred in hexane (50 mL) as n-BuLi (0.0206 moles, 13.0 mL of 1.6 M solution in hexane) was added drop wise. This mixture was allowed to stir overnight during which time a sticky solid precipitate formed. The volatile materials were then removed and the resulting orange residue washed with pentane (2×10 mL). The solid was dried under vacuum and isolated as a deep orange solid which was used without further purification or analysis (2.40 g, 94.5% yield).

Preparation of Dimethylsilyl(indenyl)(t-butylamido)TiCl$_2$.
Dimethylsilyl(indenyl) (t-butylamino)Li$_2$ (1.20 g, 0.0047 moles) in THF (20 mL) was added slowly to a slurry of TiCl$_3$(THF) (1.728 g, 0.0047 moles) in THF (100 mL). After addition was complete this mixture was allowed to stir for an additional 1 hr. PbCl$_2$ (0.65 g, 0.0024 moles) was then added as a solid and the mixture was allowed to stir for an additional 1 hr. After the reaction period the volatile materials were removed and the residue extracted and filtered using toluene. Removal of the toluene resulted in the isolation of a dark residue which was extracted with hexane and concentrated until solids were seen, then placed in a refrigerator at −20° C. for several hours. Solid was isolated by cold filtration and dried under vacuum resulting in the isolation of a deep red-brown solid (1.16 g, 68.6% yield).

$^1$H NMR (C$_6$D$_6$): d0.306 (s, 3H), 0.519 (s, 3H), 1.320 (s, 9H), 6.255 (d, 1H), 6.935 (m, 2H), 7.025 (t, 1H), 7.255 (d, 1H), 7.55 (d, 1H).

Preparation of Dimethylsilyl(indenyl)(t-butylamido)TiMe$_2$.
Dimethylsilyl(indenyl) (t-butylamido)TiCl$_2$ (0.90 g, 0.0025 moles) in diethylether (50 mL) as MeMgBr (0.0050 moles, 1.66 mL of 3.0 M in diethylether) was added drop wise. This mixture was allowed to stir for 1 hr., where the volatile materials were removed and the residue and filtered using hexane. Removal of the hexane resulted in the isolation of a dark yellow-green solid (0.60 g, 75.2% yield).

$^1$H NMR (C$_6$D$_6$): d-0.127 (s, 3H), 0.374 (s, 3H), 0.560 (s, 3H), 0.845 (s, 3H), 1.464 (s, 9H), 6.060 (d, 1H), 6.885 (t, 1H), 7.010 (d, 1H), 7.085 (m, 1H), 7.470 (t, 2H).

EXAMPLE 3

Synthesis of Catalyst B, [N-(1,1-dimethylethyl)-1,1-dimethyl-1-[(1,2,3,4,5-η)-1,5,6,7-tetrahydro-s-indacen-1-yl]silanaminato(2-)-N]dimethyltitanium:
Preparation of 3,5,6,7-Tetrahydro-s-Hydrindacen-1(2H)-one.
Indan (94.00 g, 0.7954 moles) and 3-chloropropionyl chloride (100.99 g, 0.7954 moles) were stirred in CH$_2$Cl$_2$ (300 mL) at 0° C. as AlCl$_3$ (130.00 g, 0.9750 moles) was added slowly under a nitrogen flow. The mixture was then allowed to stir at room temperature for 2 hours. The volatile materials were then removed. The mixture was then cooled to 0° C. and concentrated H$_2$SO$_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatile materials removed. The desired product was then isolated via-recrystallization from hexane at 0° C. as pale yellow crystals (22.36 g, 16.3% yield).

$^1$H NMR (CDCl$_3$): d2.04–2.19 (m, 2H), 2.65 (t, $^3J_{HH}$=5.7 Hz, 2H), 2.84–3.0 (m, 4H), 3.03 (t, $^3J_{HH}$=5.5 Hz, 2H), 7.26 (s, 1H), 7.53 (s, 1H).

$^{13}$C NMR (CDCl$_3$): d25.71, 26.01, 32.19, 33.24, 36.93, 118.90, 122.16, 135.88, 144.06, 152.89, 154.36, 206.50.

GC-MS: Calculated for $C_{12}H_{12}O$ 172.09, found 172.05.

Preparation of 1,2,3,5-Tetrahydro-s-indacen.

3,5,6,7-Tetrahydro-s-Hydrindacen-1(2H)-one (6.650 g, 38.61 mmol) and NaBH$_4$ (1.461 g, 38.61 mmol) were stirred in diethylether (100 mL) at 0° C. as EtOH (100 mL) was added slowly. This mixture was then allowed to stir overnight at room temperature. After the reaction period the mixture was quenched by pouring over ice. The mixture was then acidified (pH=1) with 1M HCR. The organic layer was then separated and washed with 1M HCl (2×100 mL) and the volatile materials removed. The residue was then redissolved in benzene and refluxed with p-toluensulfonic acid (0.10 g) in a Dean-Stark apparatus overnight removing $H_2O$ as it was formed. The reaction mixture was then washed with saturated NaHCO$_3$ (2×100 mL). The organic fraction was then dried over MgSO$_4$, filtered, and the volatile materials removed resulting in the isolation of a pale yellow solid. Further purification via column chromatography resulted in the isolation of the desired product as a pale yellow powder (1.200 g, 19.9% yield).

$^1$H NMR (CDCl$_3$): d2.0–2.2 (m, 2H), 2.8–2.9 (m, 4H), 3.33 (s, 3H), 6.64 (d, $^3J_{HH}$=5.4 Hz, 1H), 6.82 (d, $^3J_{HH}$=5.4 Hz, 1H), 7.25 (s, 1H), 7.32 (s, 1H).

$^{13}$C NMR (CDCl$_3$) d26.00, 32.67, 38.52, 116.77, 119.84, 131.94, 133.26, 140.87, 142.11, 142.25, 143.32.

Preparation of 1,2,3,5-Tetrahydro-s-indacene, lithium salt.

1,2,3,5-Tetrahydro-s-indacen (1.790 g, 11.46 mmol) was stirred in hexane (50 mL) as nBuLi (13.75 mmol, 6.88 mL of 2.0 M solution in cyclohexane) was slowly added. This mixture was then allowed to stir overnight. After the reaction period the solid was collected via suction filtration as an off-white solid which was washed with hexane, dried under vacuum, and used without further purification or analysis (1.679 g, 90.3% yield).

Preparation of N-(1,1-Dimethylethyl)-1,1-dimethyl-1-(1,5, 6,7-tetrahydro-s-indacen-1-yl)silanamine.

1,2,3,5-Tetrahydro-s-indacene, lithium salt (1.790 g, 11.04 mmol) in THF (25 mL) was added drop wise to a solution of ClSi(CH$_3$)$_2$-NH-tBu (2.157 g, 16.56 mol) in THF (50 mL). This mixture was then allowed to stir at room temperature overnight. After the reaction period the volatile materials were removed and the residue extracted and filtered using hexane. The removal of the hexane resulted in the isolation of the desired product as a yellow oil (2.799 g, 88.8% yield).

$^1$H NMR (CDCl$_3$) d-0.041 (s, 3H), 0.018 (s, 3H), 1.12 (s, 1H), 1.8–2.0 (m, 2H), 2.7–3.0 (m, 4H), 3.51 (s, 1H), 6.62 (d, $^3J_{HH}$=5.2 Hz, 1H), 6.95 (d, $^3J_{HH}$=4.9 Hz, 2H), 7.36 (s, 1H), 7.53 (s, 3H).

$^{13}$C NMR (CDCl$_3$) d-0.42, −0.28, 26.42, 32.97, 33.21, 33.84, 48.24, 49.49, 117.12, 119.33, 129.34, 135.50, 140.08, 141.03, 143.81, 144.29.

Preparation of N-(1,1-Dimethylethyl)-1,1-dimethyl-1-(1,5, 6,7-tetrahydro-s-indacen-1-yl)silanamine, dilithium salt.

N-(1,1-Dimethylethyl)-1,1-dimethyl-1-(1,5,6,7-tetrahydro-s-indacen-1-yl)silanamine (2.799 g, 9.80 mmol) was stirred in hexane (75 mL) as nBuLi (21.57 mmol, 10.78 mL of 2.0 M solution in cyclohexane) was added drop wise. This mixture was then allowed to stir overnight during which time a precipitate formed. After the reaction period the mixture was filtered and the desired product isolated as an off-white solid and used without further purification or analysis (1.803 g, 61.9% yield).

Preparation of Dichloro[N-(1,1-dimethylethyl)-1,1-dimethyl-1-[(1,2,3,4,5-η)-1,5,6,7-tetrahydro-s-indacen-1-yl]silanaminato(2-)-N]titanium.

N-(1,1-Dimethylethyl)-1,1-dimethyl-1-(1,5,6,7-tetrahydro-s-indacen-1-yl)silanamine, dilithium salt (0.737 g, 2.48 mmol) in THF (25 mL) was added drop wise to a slurry of TiCl$_3$(THF)$_3$ (0.919 g, 2.48 mmol) in THF (50 mL). This mixture was allowed to stir for 1 hour. PbCl$_2$ (0.345 g, 1.24 mmol) was then added and the mixture allowed to stir for an additional 45 minutes. After the reaction period the volatile materials were removed and the residue extracted and filtered using hexane. Removal of the hexane resulted in the isolation of a brown powder. This residue was then dissolved in hexane and cooled to −78° C. The supernate was then removed again resulting in the isolation of a brown powder. This procedure was then repeated at −15° C. resulting in the isolation of the desired product as a brown powder (0.168 g, 16.8% yield).

$^1$H NMR (C$_6$D$_6$): d0.35 (s, 3H), 0.61 (s, 3H), 1.35 (s, 9H), 1.6–1.9 3 (m, 2H), 2.5–2.8 (m, 4H), 6.28 (d, $^3J_{HH}$=3.1 Hz, 1H), 6.97 (d, $^3J_{HH}$=3.0 Hz, 1H), 7.07 (s, 1H), 7.51 (s, 1H).

$^{13}$C NMR (C$_6$D6): d0.86, 3.36, 26.42, 32.40, 32.52, 32.73, 62.60, 97.42, 119.50, 120.50, 121.38, 135.28, 136.19, 147.56, 148.29.

Preparation of Dimethyl[N-(1,1-dimethylethyl)-1,1-dimethyl-1-[(1,2,3,4,5-η)-1,5,6,7-tetrahydro-s-indacen-1-yl]silanaminato(2-)-N]titanium.

Dichloro[N-(1,1-dimethylethyl)-1,1-dimethyl-1-[(1,2,3, 4,5-.eta.)-1,5, 6,7-tetrahydro-s-indacen-1-yl]silanaminato (2-)-N]titanium (0.168 g, 0.420 mmol) was stirred in diethylether (50 mL) as MeMgBr (0.920 mmol, 0.31 mL of 3.0 M solution in diethylether) was added drop wise. This mixture was then stirred for 1 hour. After the reaction period the volatile materials were removed and the residue extracted and filtered using hexane. Removal of the hexane resulted in the isolation of the desired product as a yellow solid (0.0978 g, 64.8% yield).

$^1$H NMR (C$_6$D6): d-0.13 (s, 3H), 0.40 (s, 3H), 0.62 (s, 3H), 0.86 (s, 3H), 1.47 (s, 9H), 1.8–1.9 (m, 2H), 2.5–2.8 (m, 4H), 6.07 (d, $^3J_{HH}$=3.0 Hz, 1H), 7.02 (d, $^3J_{HH}$=3.0 Hz, 1H), 7.31 (s, 1H), 7.40 (s, 1H).

$^{13}$C NMR (C$_6$D$_6$): d1.97, 4.21, 26.83, 32.55, 32.65, 34.44, 53.13, 55.35, 58.34, 90.84, 113.66, 119.93, 121.60, 126.53, 133.31, 143.96, 144.61.

Polymer Preparation:

A two liter stirred reactor was charged with the desired quantities of mixed alkane solvent (Isopar-E available from Exxon Chemicals Inc., ca. 500 ml) and of styrene comonomer (ca. 500 ml). Hydrogen was added to the reactor by differential pressure expansion from a 75 ml addition tank, (50 delta psi, 35 kPa). The reactor was heated to the run temperature, 90° C., and the reactor was saturated with ethylene at the desired pressure (200 psig, 1380 kPa). Catalyst and cocatalyst were mixed in a dry box by mixing the catalyst with equimolar quantities of the cocatalyst, tris(pentafluorophenyl)borane, in toluene in an inert atmosphere glove box. The resulting solution was transferred to a catalyst addition tank and injected into the reactor. The polymerization was allowed to proceed with ethylene on demand. Additional charges of catalyst and cocatalyst, if used, were prepared in the same manner and were added to the reactor periodically. At the end of the run, the reactor was pressurized up to ca. 400 psi (2760 kPa) with nitrogen. The reactor was then emptied into a nitrogen purged vessel containing ca. 100 ml isopropanol and 20 ml anti-oxidant solution in toluene (either Irganox 1010, 10 g/L or an Irganox 1010/Irgafos 168 mixture 6.7 g/L and 3.4 g/L, respectively, both available from Ciba-Geigy). This was transferred to a shallow pan and volatile materials were removed in a nitrogen purged vacuum oven at ca. 130° C. for ca. 20 hours. The oven was cooled to at least 50° C. before removing samples. Polymer samples were packaged in storage bags and labeled with appropriate information

| Example | Total Catalyst (micromoles) | Isopar E (grams) | Styrene (grams) | Run Time (min.) | Polymer Yield (grams) |
|---|---|---|---|---|---|
| 2 | 12.0 | 357 | 456 | 31 | 32.9 |
| 3 | 12.0 | 359 | 457 | 35 | 36.5 |

Ex 2, Catalyst was (1-indenyl)(tert-butyl amido) dimethylsilane titanium dimethyl.
Ex 3, Catalyst was [N-(1,1-dimethylethyl)-1,1-dimethyl-1-[(1,2,3,4,5-η)-1,5,6,7-tetrahydro-s-indacen-1-yl] silanaminato(2-)-N]dimethyltitanium.

Figure 3:
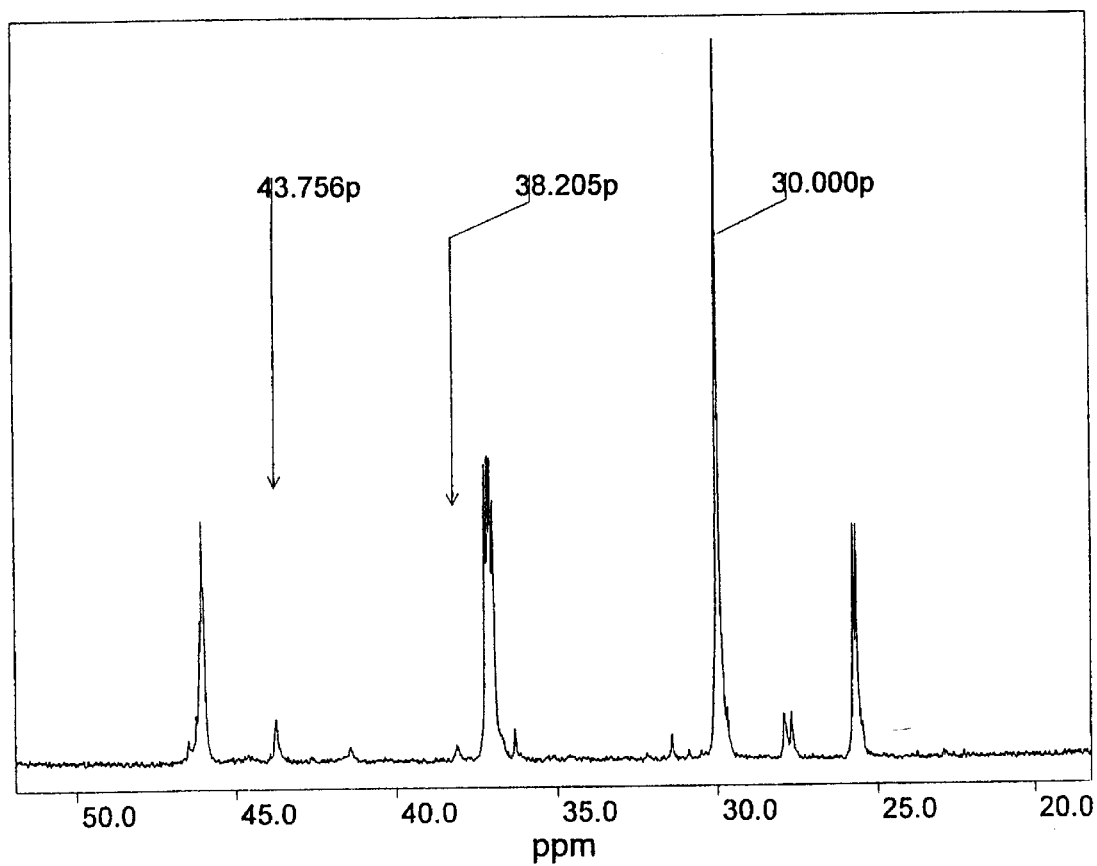
FIG. 3 is a proton decoupled carbon 13 NMR spectrum (150 MHz) of example 2 of the present invention, an ethylene/styrene copolymer containing ESSE tetrad(s).
Figure 4:
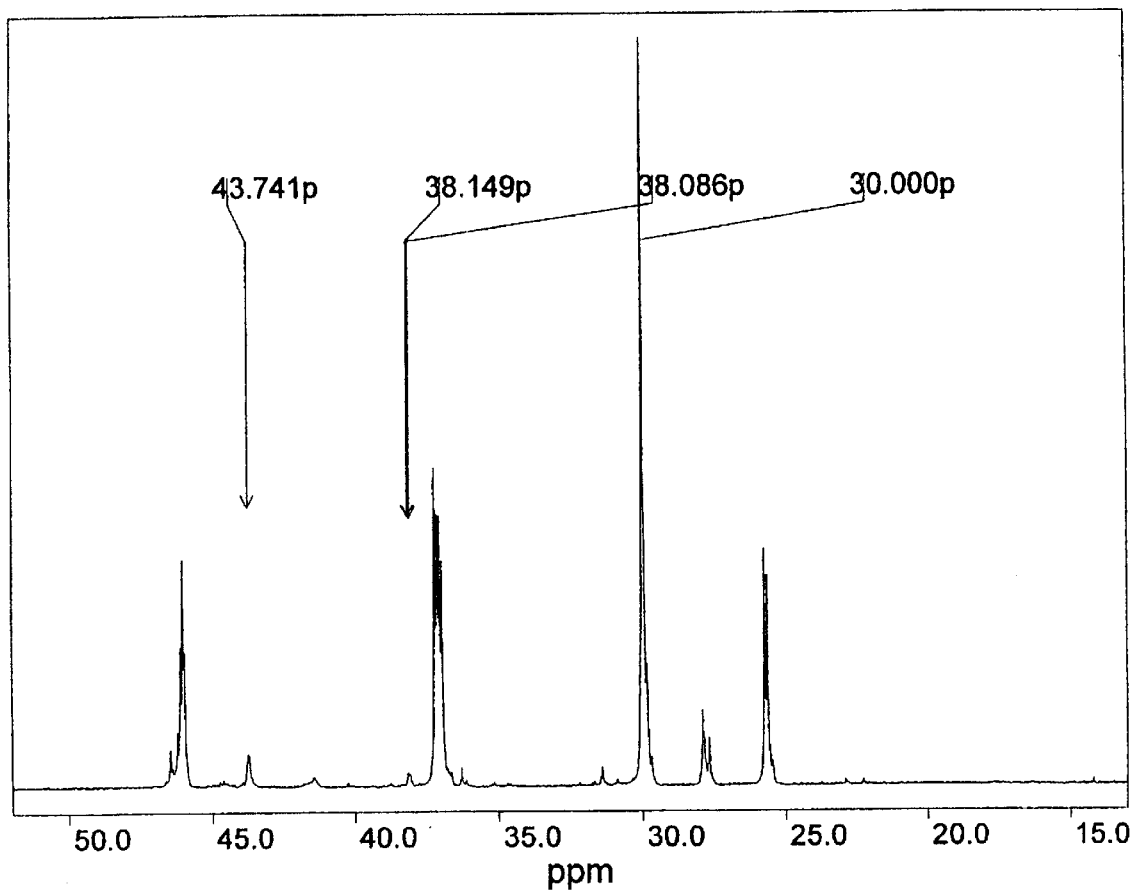
FIG. 4 is a proton decoupled carbon 13 NMR spectrum (150 MHz) of example 3 of the present invention, an ethylene/styrene copolymer containing ESSE tetrad(s).

FIGS. 3 and 4 were the proton decoupled carbon 13 NMR spectra (150 MHz) of the above prepared ethylene/styrene copolymers of examples 2 and 3 respectively. The occurrence of ESSE tetrads were indicated by the peaks at 43.756 and 38.205 ppm for example 2 and 43.741, 38.149 and 38.086 ppm for example 3.

We claim:
1. An interpolymer comprising
1) at least one aliphatic alpha olefin having from 2 to 12 carbon atoms; and
2) at least one of
a) a vinyl aromatic monomer; or
b) a hindered aliphatic or cycloaliphatic vinyl or vinylidene monomer; or
c) a combination of at least one vinyl aromatic monomer and at least one hindered aliphatic or cycloaliphatic vinyl or vinylidene monomer; and
wherein said interpolymer;
i) contains one or more tetrad sequences consisting of α-olefin/vinyl aromatic monomer or hindered aliphatic or cycloaliphatic vinyl or vinylidene monomer/vinyl aromatic monomer or hindered aliphatic or cycloaliphatic vinyl or vinylidene monomer/α-olefin insertions detectable by $^{13}$C NMR spectroscopy; and
ii) wherein the monomer insertions of said tetrads occur exclusively in a 1,2 (head to tail) manner.
2. An interpolymer of claim 1 comprising
(1) from 1 to 65 mole percent of either
(a) at least one vinyl aromatic monomer; or
(b) at least one hindered aliphatic or cycloaliphatic vinyl or vinylidene monomer; or
(c) a combination of at least one vinyl aromatic monomer and at least one hindered aliphatic or cycloaliphatic vinyl or vinylidene monomer; and

(2) from 35 to 99 mole percent of at least one aliphatic alpha olefin having from 2 to 12 carbon atoms.
3. An interpolymer of claim 1 comprising
(1) from 1 to 65 mole percent of styrene; and
(2) from 35 to 99 mole percent of ethylene or a combination of ethylene and at least one alpha olefin selected from the group consisting of propylene, 4methyl-1-pentene, butene-1, hexene-1 or octene-1; and, optionally, further comprising
(3) from 1 to 5 mole percent of a diene; wherein the total mole percent of the monomers is 100 percent.
4. An ethylene/styrene interpolymer having peaks of the carbon 13 NMR spectra which appear in the chemical shift range 43.70–44.25 ppm and 38.0–38.5 ppm, said peaks being at least three times the peak to peak noise.
5. The ethylene/styrene interpolymer of claim 4 having peaks of the carbon 13 NMR spectra which appear in the chemical shift range 43.75–44.25 ppm and 38.0–38.5 ppm, said peaks being at least three times the peak to peak noise.
6. A process for preparing α-olefin/vinyl aromatic monomer interpolymers said process comprising subjecting to Ziegler-Natta or Kaminsky-Sinn polymerization conditions, a combination of (1) one or more α-olefins, (2) one or more vinyl aromatic monomers, and (3) optionally, one or more polymerizable ethylenically unsaturated monomers other than (1) or (2); wherein
(i) said α-olefin is ethylene or a combination of ethylene and one other α-olefin having from 3 to 8 carbon atoms;
(ii) said vinyl aromatic monomer is styrene;
(iii) said catalyst is racemic-(dimethylsilanediyl)-bis-(2-methyl-4-phenylindenyl))zirconium dichloride, racemic-(dimethylsilanediyl)-bis-(2-methyl-4-phenylindenyl))zirconium 1,4-diphenyl-1,3-butadiene, racemic-(dimethylsilanediyl)-bis-(2-methyl-4-phenylindenyl))zirconium di-$C_{1-4}$ alkyl, racemic-(dimethylsilanediyl)-bis-(2-methyl-4-phenylindenyl)) zirconium di-$C_{1-4}$ alkoxide, or any combination thereof; and
(iv) an activating cocatalyst is employed and is selected from the group consisting of alkylalumoxanes; aluminum alkyls; aluminum halides; aluminum alkyl halides; strong Lewis acids; salts which contain a compatible noninterfering counterion; oxidizing; and any combination of any two or more of said cocatalysts.
7. The process of claim 6 wherein
(i) said α-olefin is ethylene;
(ii) said vinyl aromatic monomer is styrene;
(iii) said catalyst is racemic-(dimethylsilanediyl) bis-(2-methyl-4-phenylindenyl))zirconium dichloride; and
(iv) an activating cocatalyst is employed and is methylalumoxane.
8. A process for preparing α-olefin/vinyl aromatic monomer interpolymers said process comprising subjecting to Ziegler-Natta or Kaminsky-Sinn polymerization conditions, a combination of (1) one or more α-olefins, (2) one or more vinyl aromatic monomers, and (3) optionally, one or more polymerizable ethylenically unsaturated monomers other than (1) or (2); in the presence of a catalyst selected from the group consisting of (N-(1,1-dimethylethyl)-1,1-dimethyl-1-((1,2,3,4,5-η)-1,5,6,7-tetrahydro-s-indacen-1-yl) silanaminato(2-)-N)titanium dimethyl, (1-indenyl)(tert-butyl amido)dimethylsilane titanium dimethyl, ((3-tert-butyl) (1,2,3,4,5-η)-1-indenyl)(tert-butyl amido) dimethylsilane titanium dimethyl, and ((3-iso-propyl) (1,2,3,4,5-η)-1-indenyl)(tert-butyl amido)dimethylsilane titanium dimethyl.

9. The process of claim 8 wherein
   (i) said α-olefin is ethylene or a combination of ethylene and one other α-olefin having from 3 to 8 carbon atoms;
   (ii) said vinyl aromatic monomer is styrene;
   (iii) an activating cocatalyst is employed and is selected from the group consisting of alkylalumoxanes; aluminum alkyls; aluminum halides; aluminum alkyl halides; strong Lewis acids; salts which contain a compatible noninterfering counterion; oxidizing; and any combination of any two or more of said cocatalysts.

* * * * *